March 6, 1951  J. J. DUNNE ET AL  2,543,901

PLYWOOD TUBING

Original Filed May 3, 1943

INVENTOR.
J. J. DUNNE
O. S. TUTTLE
BY
James D. Heilman
Atty.

Patented Mar. 6, 1951

2,543,901

UNITED STATES PATENT OFFICE 2,543,901

PLYWOOD TUBING

James J. Dunne, Westport, Conn., and Orvil S. Tuttle, New Rochelle, N. Y., assignors to United States Plywood Corporation, New York, N. Y., a corporation of New York Original application May 3, 1943, Serial No. 485,478, now Patent No. 2,449,526, dated February 27, 1948. Divided and this application December 31, 1945, Serial No. 638,598

7 Claims. (Cl. 138—79)

The present invention relates to the manufacture of plywood pipes, tubing and the like, of seamless construction, and is an improvement on the process and product described in the co-copending application of Theodore E. Ilch, Serial No. 457,894, filed September 10, 1942, Patent No. 2,411,542, dated November 26, 1946. This application is a divisional application from the parent application of Dunne and Tuttle, S. N. 485,478, filed May 3, 1943, Patent No. 2,449,526, dated February 27, 1948.

As in such copending Ilch application, the term "seamless" is to be understood to mean a construction in which no seam or joint between the ends of the individual veneers of which the tube is composed extends continuously in the radial direction from the interior to the exterior of the tube, the seams being suitably staggered to cause a solid mass of wood veneer, preferably composed of all the remaining veneer units, to overlie and/or underlie the seam or joint in any particular veneer unit.

In the process described in the abovementioned Ilch application, individual veneer panels, cut to suitable dimensions, are coiled by hand about a longitudinal axis until the ends overlap to a greater or less extent, the temporary tube being thus of a diameter less than the final diameter, and the tube then inserted endwise into a longitudinally slit mandrel which has previously been contracted by suitable clamps or the like to a diameter less than its normal diameter, and allowed to expand within the mandrel, whereupon the veneers assume a cylindrical shape with the ends in abutting or slightly overlapping relation, the width of the veneer sections being so cut that the ends do not overlap in the finished pipe. The successive veneers are inserted in such manner that the seams or joints are in staggered relation. The veneers are coated with a suitable thermo-sensitive adhesive (except the inside face of the innermost veneer layer and the outer face of the outermost veneer layer) and after the plywood tubing has been built up to the desired thickness, the veneers are subjected to heat and pressure applied by means of a pliable or expansible fluid-tight membrane or bag inserted inside of the plywood tubing. The heat causes the adhesive to fuse and the applied pressure molds the veneers against the inside of the mandrel until a compact plywood tubing is formed. If the adhesive is of the thermo-plastic type, the plywood tubing is then allowed to cool before the clamps are removed from the mandrel, the latter being thereby allowed to expand to its normal diameter, and the plywood tubing then removed; if the adhesive is of the thermo-setting type, the clamps about the mandrel can be released and the plywood tubing can be removed while still quite hot. The veneer sections are of progressively smaller width, to produce tube elements of increasingly smaller diameter as the building up of the plywood tubing progresses, so as to avoid overlapping of the ends of any particular veneer tubing; and the direction of the grain of the veneers is varied in the several tubular layers to produce the desired vertical crushing strength and hoop strength, the latter being important especially where the tube is to be employed as a conduit for fluids under pressure.

The coiling of the veneers is done by a gang of workmen distributed along the length of the veneer section, and it has been found in practice that this manual operation on the thin veneers results frequently in tearing the veneers. This not only causes a loss of the veneer itself, but interrupts the regular working procedure. Also, coiling by hand of each individual veneer which is to be used in building up the plywood tubing, which may have as many as fifteen and even more veneer sections, is a laborious and time-consuming operation.

It is the general object of the present invention to provide an improved procedure wherein the over-all time required for charging a mandrel with the requisite number of veneers, from the moment of beginning work on the individual veneers to the moment in which the built-up plywood tubing in the mandrel is ready for receiving the pressure and heat-applying membrane or bag, is considerably reduced, and the output correspondingly increased.

It is a further object of the invention to provide an improved process wherein breakage or tearing of the veneers during the operation of preliminary coiling is greatly reduced and even practically eliminated, and the economy of the process thereby further increased.

It is a still further object of the invention to improve upon the known process by reducing the amount of manual labor required to build up the plywood tubing within the mandrel.

Other objects of the invention will appear from the following more detailed description, and the features of novelty will be set out in the appended claims.

According to the present invention, the veneers are not coiled individually, but in pairs with the grain of one running at an angle to the grain of the other veneer. The veneers are united to each other, for example, by a bond of adhesive, or in any other suitable manner, for example, by means of staples or the like, but highly satisfactory results have been obtained by the use of an adhesive. There is formed in this way what we shall hereinafter refer to as a "double veneer," and it is an important feature of this elemental veneer construction that each veneer sheet strengthens and fortifies the other, so that when the double veneer is coiled, there is little tendency to tearing or breaking, even if one of the veneer sheets has its grain running at right angles to the axis of the cylinder into which the veneers are coiled.

A two-ply veneer is not, so far as we are aware, an article of commerce. Basically, it has the fault which a plywood construction is designed to eliminate; namely, it is an unstable or unbalanced structure and tends to curl if left to itself. This curl may be either about an axis parallel to the longitudinal median line of the panel, or at an angle thereto; and even where no curl is present immediately after manufacture, a curl usually soon develops upon change in the moisture content of the veneer plies. So far as we have been able to ascertain, no commercial use has been made of such a two-ply or double veneer.

The present invention utilizes to advantage the normal tendency of a double veneer, in which the grains run at angles to each other, to curl; for in accordance with our process, the original curl is utilized in coiling the double veneer into the cylindrical form. The initial bending or coiling operation is thus facilitated by the original curvature of the double veneer.

A further advantage flowing from the use of our double veneers resides in the fact that a large number of such double veneers can be simultaneously manufactured in a press, whether heated by steam, by electro-magnetic induction, or otherwise. The labor involved in manufacturing a single veneer unit is considerably less than the labor required to coil and insert the second veneer in the process described in the Ilch application above mentioned. There is furthermore less loss in handling the double veneers than in the more frangible single veneers.

The further details of our process will be described in connection with the attached drawing, wherein Fig. 1 shows a section of a double veneer constructed in accordance with the invention.

Figures 1, 2:
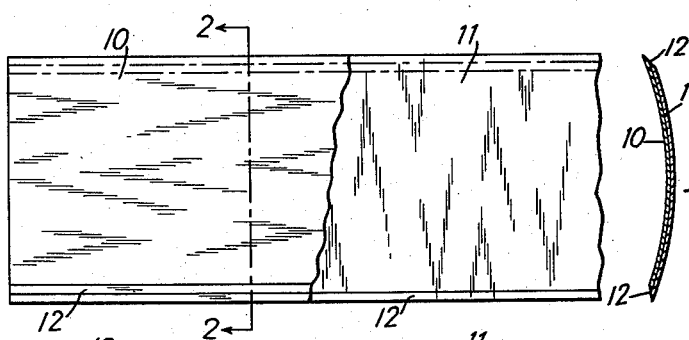
Fig. 2 is an end view of the double veneer showing the spontaneous curl thereof which is taken advantage of in our improved process, the thickness being shown somewhat exaggerated for greater clearness.

The double veneers employed in the present invention are preferably manufacturer, as already indicated, by bonding together two veneers 10, 11 with their grains running at an angle to each other, by means of an interposed layer of a thermo-sensitive, for example, a flexible, thermoplastic adhesive. A suitable adhesive for this purpose is the known polyvinyl butyral resin, which is flexible and thermo-plastic in character and is now widely used in the manufacture of safety glass. The longitudinal edges of the double veneer section or panel are preferably scarfed as indicated at 12 to provide an overlapping joint. After removal from the press, in which the veneers are bonded together, the double veneer will either immediately or in time assume a curl either more or less about an axis parallel to the longitudinal median line of the double veneer section, as shown in Fig. 2, or about an axis at an angle thereto.

Figure 5:
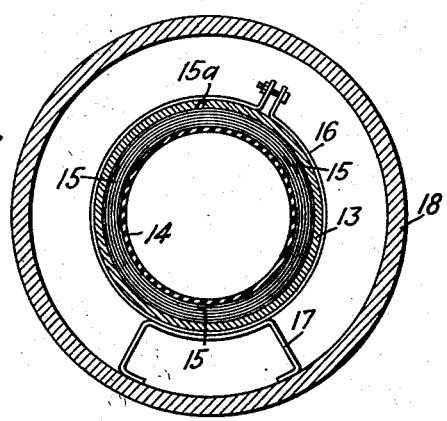
Fig. 5 is a vertical section with parts in elevation of a mandrel containing the built-up plies of double veneers and heated and pressed against the mandrel by a pliable or expansible bag containing a fluid, such as saturated steam, at suitable temperature and pressure.

The double veneers are made up of individual veneers of the same thickness or of different thicknesses; but in any event, the total thickness of the double veneer is such that it remains pliable and readily coilable into the cylindrical form with the ends overlapping to some extent. When so coiled, the double veneer is inserted into a mandrel, for example, of the type shown in the copending Ilch application above referred to, and shown in section at 13 of the attached drawing. A plurality of double veneers are employed in building up a tube or pipe; and the successive double veneer panels used in making up the successive coiled cylinders are of progressively decreasing width to allow for the decreasing width of the pipe or tube as the center is approached. The width of the double veneer panels is such that even though the longitudinal ends overlap to some extent after the cylinders, upon release, spring into position against the mandrel or against the previously inserted cylinder, there will be no overlapping except over the scarfed edges after the cylinders have been further expanded against the mandrel upon the application of heat and pressure by means of a flexible or expansible fluid-tight bag 14. As can be seen from Fig. 5, the joints of the several panels of double veneer are staggered in relation to each other, so that there is no continuous joint from the interior of the formed plywood tube to the exterior thereof, as indicated at 15. It will be understood that the mandrel 13, during the application of the heat and pressure, is in a contracted condition, brought about by clamps 16 or the like; and the mandrel can be contracted either before the insertion of the coiled double veneers, or after such insertion, but before the application of the heat and pressure by way of the bag 14. While the scarfed edges are indicated in Fig. 5 as being in perfectly fitting relationship, in actual practice, there may be a slight gap between the facing edges in at least certain instances; in no case, however, should there be any overlapping of the full thickness of any double veneer. Even in the contracted condition, the mandrel is, however, not completely closed, a small gap 15a being allowed to remain to permit the escape of vapors, gases, etc. Before the application of the heated fluid under pressure, the mandrel is positioned upon a cradle 17 within a casing 18, but as these structures form no part of the present invention, they have not been shown in detail.

It will be understood that before the double veneers are inserted within the mandrel, they are provided with a thermo-sensitive adhesive, for example, a thermo-plastic resin, upon one face or upon both faces, as the case may be, depending upon whether the particular double veneer constitutes on the one hand the outermost or innermost ply, or an intermediate ply. This adhesive may be of the thermo-plastic type above referred to, but is preferably of the thermo-setting type, so that the mandrel can be released and the plywood tubing removed while it is still quite hot, without danger of separation of the double veners from each other. The thermo-setting adhesive should be of the type which remains fluid throughout the interval required for all the layers of thermo-setting adhesive to be brought to the proper activating temperature, so that the several double plies will all be in a condition to be shifted relatively to each other at the same time and proper molding thereby assured. A thermo-setting adhesive which we have found to give highly satisfactory results is the thermo-setting resin available on the market and known as "Du Pont 4624," such resin having a long period of fluidity before it finally sets. Various phenol formaldehyde resins could, however, also be employed provided that the resin is selected in dependence on the rate of heat conduction from the innermost to the outermost double veneer. A suitable resin of this type is the "Tego" resin marketed by Resinous Products Co. Of course, where the fusion of the resin is effected by electro-magnetic induction, the matter of rate of heat conduction is of no moment and thermo-setting resins having only a short period of fluidity can be employed.

Figure 3:
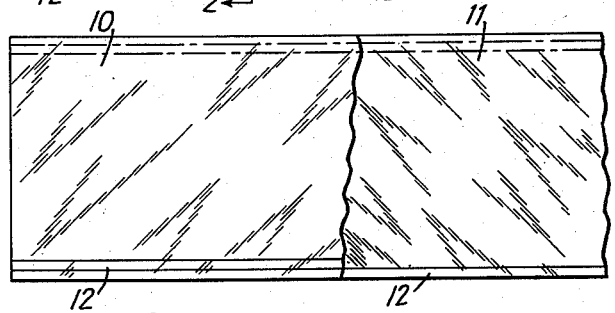
Figs. 3 and 4 show double veneers with the grains running in different directions.
Figure 4:
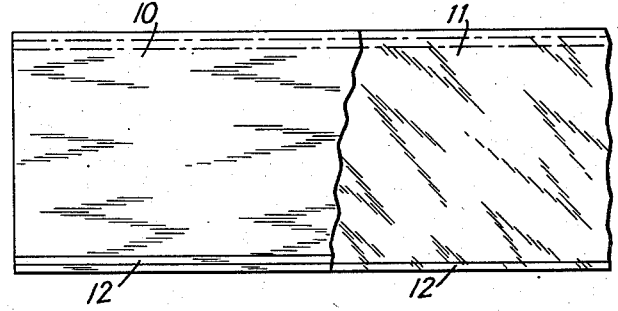

The grain of the two veneers constituting a double veneer may run at various angles, as indicated in Figs. 3 and 4; and it is not necessary even that any grain run parallel to the axis of the tube. The arrangement of the grains will depend upon the tube characteristics desired, and will be based upon principles well understood in the art. Thus, the grains of each particular double veneer may run at 90°, 45°, or at any other angle to each other. It will be understood that where the circumference of the formed tube is greater than the width of the veneers available in any particular wood, several sections of veneer may be united in any suitable manner, as by edge to edge bonding, in well known manner.

Variations from the specific materials and procedures above described will occur to those skilled in the art without departing from the principles of the invention. Thus, the two veneers of the double veneer may be provided with an intervening, thermo-sensitive layer of adhesive and be held together sufficiently strongly with a temporary adhesive like ordinary glue applied at spaced areas to permit the rolling operation, the two plies of each double veneer being then permanently bonded together at the same time that the several double veneers are bonded and molded to each other within the mandrel. We have found, however, that best results are obtained by first permanently uniting the two veneers of each double veneer. Also, certain advantages of our invention could be obtained by the use of veneer units composed of three plies of veneer, but such a structure is first of all usually balanced and, therefore, will not provide the initial curl which aids greatly in rolling the veneer unit into the cylindrical form. The three-ply veneer would also be much more difficult to use, except perhaps for pipes of very large diameter. Also, double veneers can be combined in any suitable relation with single ply veneers but the advantages of our invention will be reduced to a corresponding extent. It will further be evident that the edges of the double veneers could be cut rectangularly instead of scarfed or in any other fashion.

It has been stated above that the double veneers can be made using a thermo-plastic adhesive such as polyvinyl butyral resin. A perfectly satisfactory double veneer can also be made using a thermo-setting adhesive such as "Tego" hereinbefore described or using any good phenol-formaldehyde resin adhesive.

It is also satisfactory to use a thermo-plastic adhesive on the faces of the double veneers in place of the thermo-setting adhesives described above. For example, an adequate thermo-plastic adhesive would be obtained if a fifteen per cent solution of polyvinyl butyral resin dissolved in ethyl alcohol were spread on the appropriate faces of the double veneer and allowed to dry before being inserted within the mandrel.

What we claim is:

1. A heat and pressure molded seamless plywood tube comprising a plurality of telescoped jointed units united to each other by intervening layers of thermo-sensitive bonding material, each unit comprising two layers of veneer bonded to each other to form an integral double-ply structure and being shaped as a continuous, tubular shell, the joints in the plurality of units being staggered.

2. A seamless plywood tube as defined in claim 1, wherein the grain of one veneer of each unit runs at approximately a right angle to the grain of the other veneer of such unit, the longitudinal edges of the individual units overlapping in a scarf joint.

3. A heat and pressure molded seamless plywood tube comprising a plurality of telescoped jointed units united to each other by intervening layers of thermo-sensitive bonding material, each unit comprising two layers of veneer bonded to each other to form an integral double-ply structure and being shaped as a continuous, tubular shell of substantially 360° extent, the joints in the plurality of units being staggered.

4. A heat and pressure molded seamless plywood tube, comprising a plurality of telescoped jointed units united to each other by intervening layers of thermo-sensitive bonding material, each unit comprising two layers of veneer with longitudinal and transverse edges bonded to each other with their grains running at an angle to each other, to form an integral double-ply structure and being shaped as a continuous, tubular shell of substantially 360° extent, the joints in the plurality of units being staggered, and extending approximately parallel to the axis of the tube, the four longitudinal edges of each double-ply unit meeting at a common joint.

5. A heat and pressure molded seamless plywood tube comprising a plurality of telescoped jointed units united to each other by intervening layers of thermo-sensitive bonding material, each unit comprising two layers of veneer with longitudinal and transverse edges bonded to each other to form an integral double-ply structure and being shaped as a continuous, tubular shell of substantially 360° extent, the joints in the plurality of units being staggered, and extending approximately parallel to the axis of the tube, the four longitudinal edges of each double ply unit overlapping in a common scarf joint.

6. A heat and pressure molded seamless plywood tube comprising a plurality of telescoped jointed units united to each other by intervening layers of thermo-sensitive bonding material, each unit comprising two layers of veneer pre-bonded to each other with a thermo-setting adhesive to form an integral double-ply structure, said unit being rectangular in shape and having a length equal to the length of the tube, and having a width such that in final form it constitutes a complete and continuous tubular shell of substantially 360° extent, the joints in the plurality of units being staggered.

7. A heat and pressure molded seamless plywood tube comprising a plurality of telescoped jointed units united to each other by intervening layers of thermo-sensitive bonding material, each unit comprising two layers of veneer pre-bonded to each other with a thermo-setting adhesive to form an integral double-ply structure, said unit being rectangular in shape and having a length equal to the length of the tube, and having a width such that in final form it constitutes a complete and continuous tubular shell of substantially 360° extent, the joints in the plurality of units being staggered, and the double-ply units overlapping without increasing the thickness of the unit by reason of each unit having two sides formed with a long taper so that a scarf jointed solid cylinder will result.

JAMES J. DUNNE.
ORVIL S. TUTTLE.

REFERENCES CITED

The following references are of record in the file of this patent:

UNITED STATES PATENTS

| Number | Name | Date |
|---|---|---|
| 51,735 | Mayo | Dec. 26, 1865 |
| 1,933,279 | Quarnstrom | Oct. 31, 1933 |
| 2,382,834 | Tynan | Aug. 14, 1945 |
| 2,402,040 | Goldman | June 11, 1946 |
| 2,411,542 | Ilch | Nov. 26, 1946 |